US008370083B2

(12) United States Patent
Wagner et al.

(10) Patent No.: US 8,370,083 B2
(45) Date of Patent: Feb. 5, 2013

(54) METHOD FOR AUTOMATICALLY DETERMINING THE CONDITION OF A HYDRAULIC AGGREGATE

(75) Inventors: Paul-Heinz Wagner, Much-Birrenbachshöhe (DE); Bernd Thelen, Much (DE)

(73) Assignee: Wagner Vermögensverwaltung - GmbH & Co., KG, Much-Birrenbachshöhe (DE)

( * ) Notice: Subject to any disclaimer, the term of this patent is extended or adjusted under 35 U.S.C. 154(b) by 383 days.

(21) Appl. No.: 12/522,412

(22) PCT Filed: Jan. 10, 2008

(86) PCT No.: PCT/EP2008/050240

§ 371 (c)(1), (2), (4) Date: Jul. 8, 2009

(87) PCT Pub. No.: WO2008/084077

PCT Pub. Date: Jul. 17, 2008

(65) Prior Publication Data

US 2010/0293933 A1 Nov. 25, 2010

(30) Foreign Application Priority Data

Jan. 12, 2007 (EP) .......................... 10 2007 001 922

(51) Int. Cl.
*G01B 3/56* (2006.01)
*G06F 11/30* (2006.01)

(52) U.S. Cl. ............. 702/34; 702/35; 702/138; 702/184

(58) Field of Classification Search .............. 702/34–45, 702/138, 182–189
See application file for complete search history.

(56) References Cited

U.S. PATENT DOCUMENTS

| | | | | |
|---|---|---|---|---|
| 3,779,457 | A | 12/1973 | Cornyn | |
| 6,349,252 | B1 | 2/2002 | Imanishi et al. | |
| 6,505,501 | B1 | 1/2003 | Murphy et al. | |
| 7,272,533 | B2 * | 9/2007 | Schlosser | 702/184 |
| 2002/0077734 | A1 | 6/2002 | Muller | |
| 2004/0148061 | A1 * | 7/2004 | Polzin et al. | 701/1 |

FOREIGN PATENT DOCUMENTS

| | | | |
|---|---|---|---|
| DE | 35 30 137 | | 8/1985 |
| DE | 201 20 609 | | 7/2003 |
| DE | 10254819 | | 6/2004 |
| DE | 102004017979 | | 11/2005 |
| EP | 00 92 123 | | 4/1983 |
| EP | 01 89 021 | | 11/1985 |
| EP | 07 51 446 | | 9/1996 |
| EP | 1213394 | | 6/2002 |
| EP | 1580440 | * | 9/2005 |
| JP | 59194215 | | 11/1984 |
| WO | 2007/082637 | | 7/2007 |
| WO | WO 2007/082637 | * | 7/2007 |

OTHER PUBLICATIONS

International Search Report for corresponding application No. PCT/EP2008/050240 completed Apr. 10, 2008.

* cited by examiner

*Primary Examiner* — Phuong Huynh
(74) *Attorney, Agent, or Firm* — Renner, Otto, Boisselle & Sklar, LLP

(57) ABSTRACT

A hydraulic aggregate for supplying a hydraulic cylinder in consecutive load strokes is monitored for its working load in order to determine the condition of the aggregate automatically. For this purpose, the time integral of the pressure is determined for each load stroke. The pressure and duration are processed into a characteristic number which indicates the wear. This makes it possible to diagnose the condition of the hydraulic aggregate at any time.

8 Claims, 2 Drawing Sheets

METHOD FOR AUTOMATICALLY DETERMINING THE CONDITION OF A HYDRAULIC AGGREGATE

Figure 1:
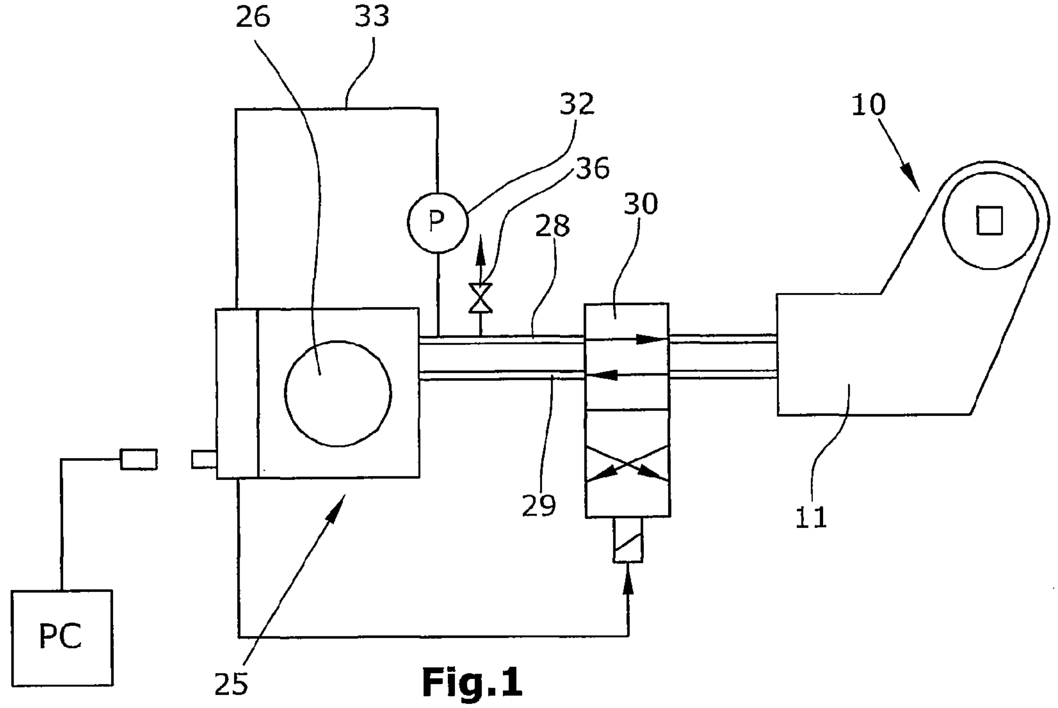

The invention relates to a method for automatically determining the condition of a hydraulic aggregate provided to feed a hydraulic cylinder for performing load strokes.

DE 10 2004 017979 A1 describes a method for angle-controlled rotation of an object, wherein a hydraulic aggregate delivers a pressure for the hydraulic cylinder of a power wrench. The hydraulic aggregate is provided with a control device which is operative to switch a control valve in dependence on the generated pressure. With each load stroke, the pressure will first increase with a higher pitch and then with a lower pitch until the end stop portion of the hydraulic cylinder has been reached.

Modern machines and working equipment require regular maintenance work to be performed on them in order to check these devices for possibly existing defects or imminent defects. Such a maintenance procedure also includes an exchanging of wear parts. Normally, maintenance is performed at regular time intervals or after a predetermined number of operating hours of the device. Such an interval-based scheduling of maintenance processes is only to a small extent oriented on the real working load of the device. For instance, it is left unconsidered whether the hydraulic machine has carried out only slight load strokes or possibly has been pushed to the limits of its working capacity.

For complex systems which are subjected to different load conditions, “condition monitoring” has been developed wherein a condition detection is performed for avoiding fall-out of the system. The detected condition indicates how far the monitored system is still away from a defect or fallout to be expected in the near future. In this manner, subtle changes in the system can be recognized early, and their causes can be approximated. Said condition monitoring allows for a condition-oriented servicing of the system and substitutes for the preventive servicing, heretofore the usual practice, wherein maintenance work was carried out on the machine in fixed maintenance intervals. Further, condition monitoring makes it possible to perform the condition diagnosis online.

It is an object of the invention to provide a method for automatic condition detection of a hydraulic aggregate, which method shall make it possible to perform the condition detection close to reality.

Thus, it is provided that, for at least one aggregate component, a wear-indicating characteristic number is computed from the pressure and the duration of operation since start-up, that a wear degree is determined from said characteristic number and from a wear limit which has been set for the aggregate component, and that, for the whole aggregate, the maximum among the wear degrees of all aggregate components is determined and a total wear degree is obtained on the basis of said maximum.

The level of the built-up pressure is indicative of the generated power from which, in combination with the duration of the load stroke, it is possible to determine the work or an associated value. Thus, the method will differentiate the load strokes on the basis of the resistance met by them. Therefore, heavy-going load strokes will be ranked higher in the evaluation than easy-going load strokes.

The method of the invention is suited particularly for hydraulic aggregates provided to drive hydraulic power wrenches for the tightening of screws, nuts and similar rotatable parts. In such use, the pressure generated during a load stroke is dependent on the resistance that the to-be-rotated part offers to the rotational movement.

The wear degree is indicative of the accumulated working load. This is to be understood in the sense that, from the most recent maintenance onward, all working processes performed by the hydraulic aggregate will contribute to increasing the wear degree, namely in correspondence to the work performed. A hydraulic aggregate which has been used to perform heavy work will reach the upper wear limiting value, i.e. the wear limit, earlier than a hydraulic aggregate which has been used to perform easy-going work only, when compared on the basis of the same number of operating hours. The wear degree, as it were, is a measure of the “exhaustion” of the device. From the wear degree, it is possible to compute the number of the operating hours which are still allowable up to the next maintenance process. This computation is carried out automatically in the control device of the hydraulic aggregate. An indication of the still remaining operating hours can be called up by the push of a button. In the computation of the still available operating hours, the average degree of heaviness of the working load handled so far is used as a basis for estimating the future work still to be performed.

A preferred variant of the invention provides that, for computing said characteristic number, the time integral of the pressure is determined. For this purpose, there is evaluated the surface area under the pressure curve obtained during the load strokes. According to a simplified variant, it is provided that the pressure and the duration of a load stroke are processed as parameters for the determination and respectively the further development of the wear degree.

The pressure and the duration of a load stroke are processed as parameters for the determination and respectively the further development of the condition variable. This can be suitably carried out by computing the product of pressure and duration so as to obtain a load value of the respective load stroke. The wear degree accumulated up to this point will be increased by this load value.

The pressure and the duration of the load strokes are not necessarily the only parameters which influence the condition variable. Further, for instance, the number of the load strokes or also the temperature of the hydraulic medium can be included in the computation of the condition variable. This inclusion can be provided in various manners. For example, each parameter can be given a weighting.

Also the signals of sensors indicating error messages can be included in the computation of the condition variable. For instance, frequent exceeding of a limit temperature would lead to an extraordinary increase of the condition variable. Further, the possibility exists to measure the length of time that the hydraulic aggregate has been working below and above a limit temperature. By way of example: The hydraulic aggregate has been running for 50 operating hours, 30 hours thereof at a temperature above 50° C.

The invention further relates to a hydraulic aggregate provided to feed a hydraulic cylinder for performing load strokes.

Said hydraulic aggregate can detect and store further monitored parameters, such as, e.g., the number of operating hours from the start and from the most recent maintenance; the product of length of operation, current and voltage of the motor as electric work; the product of the length of operation of the motor, the pressure and the volume flow as hydraulic work; the product of temperature and time; the peak value of the electric current; the peak value of the voltage and/or the minimum value of the voltage; the peak value of the temperature; the peak value of the pressure; and the product of volume flow and time for detecting the accumulated pumped volume.

Apart from the condition determination, still further functions can be provided, such as e.g. a self-test of the hydraulic aggregate. For this purpose, the two tubes for forward and backward flow will be connected, and the maximum pressure will be adjusted to a presettable value, e.g. 400 bar. Due to the elasticity of the tubes which are closed at their ends, the pressure will linearly build up over time in the manner of a reference curve to be recorded and stored, respectively. Then, it will be examined whether the measured curve has taken the preset development of the reference curve.

Further examined are the operational readiness of the pressure sensors for the advance stroke and the return stroke, the current flow of the motor, the pressure build-up, i.e. the functioning of the main valve, the function of the gear pump, the functioning of the number of pump elements, as well as the pressure relief, i.e. the functioning of the relief valve.

The control device is adapted for connection thereto of a diagnosis plug for read-out of wear-relevant data or of the whole device history. In this manner, the condition of the aggregate can be called up at all times. Error diagnosis is facilitated because the device is operative for intermediate storage of critical conditions.

Further, the control device can be interlinked with the Internet or another data network. In this case, the data can be transmitted from the aggregate to a maintenance server, e.g. on a daily basis. Parameter adaptations can be logged on the maintenance server and, at the next diagnosis, be automatically entered into the program.

An embodiment of the invention will be explained in greater detail hereunder with reference to the drawings.

Figure 2:
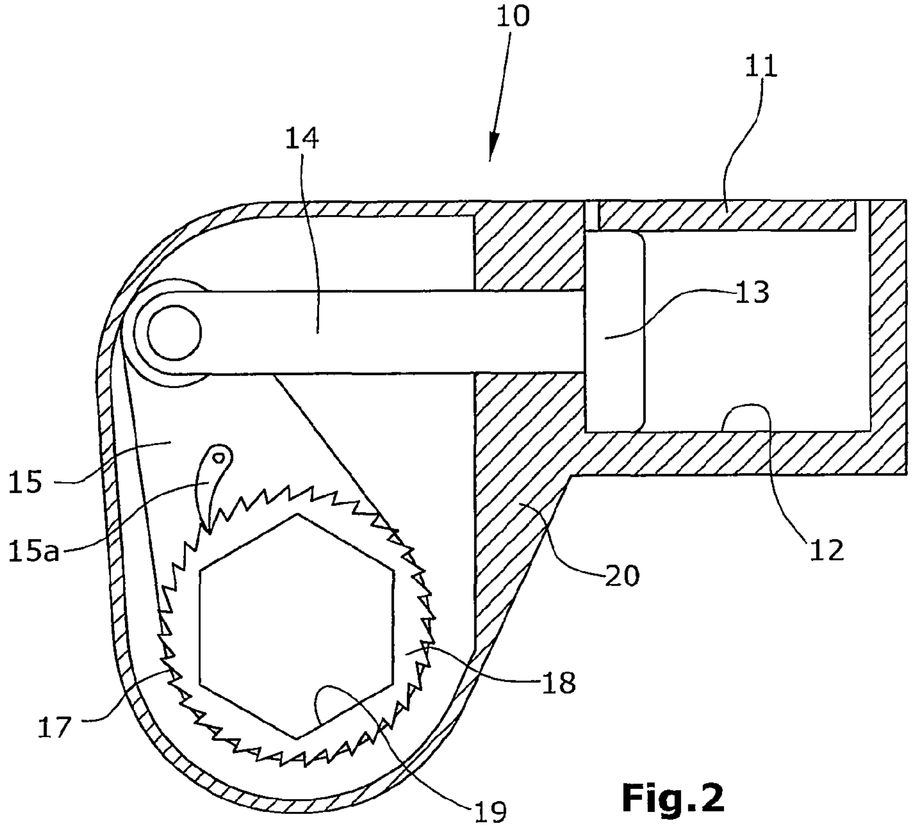
Figure 3:
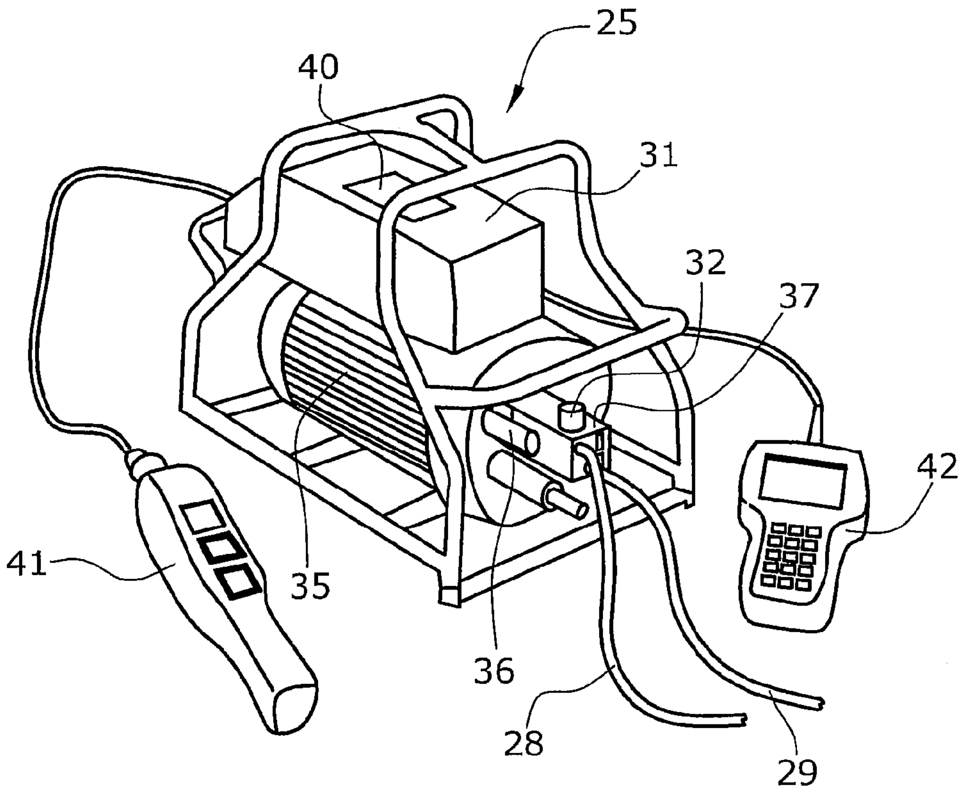
Figure 4:
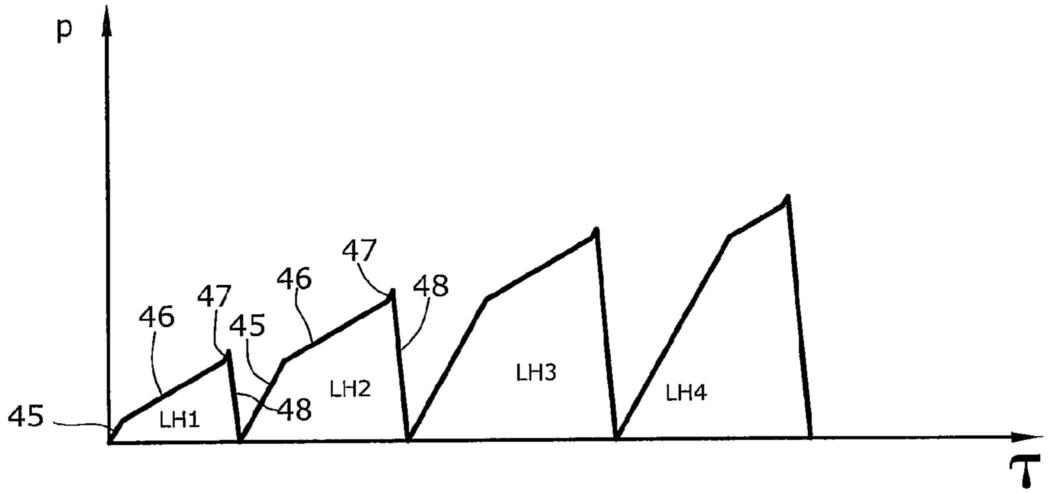

In the drawings, the following is shown:

FIG. 1 is a schematic view of an embodiment of a screwdriving arrangement comprising a hydraulic aggregate and a power wrench for turning a screw, FIG. 2 is a schematic view the a power wrench including a piston/cylinder drive, FIG. 3 is a view of the complete hydraulic aggregate inclusive of the remote control and the programming unit, and FIG. 4 is a time diagram of the pressure development in several successive load strokes.

In FIGS. 1 and 2, a power wrench 10 is schematically illustrated. The power wrench comprises a hydraulic piston/cylinder drive 11 including a hydraulic cylinder 12 and piston 13 arranged for movement in the cylinder. The piston is connected to a piston rod 14, and the end of the piston rod engages a lever 15 which, by a latch 15*a*, engages the toothing of a ratchet wheel 17. Ratchet wheel 17 is a part of an annular member 18 formed with a socket 19 for insertion of a key nut or of a screw head which is to be rotated. Reciprocating movement of piston 13 will cause rotation of annular member 18 and of the screw along with it. Annular member 18 is supported in a housing 20 wherein also the piston/cylinder drive 11 is accommodated.

The pressure for the piston/cylinder drive 11 is supplied by the hydraulic aggregate 25 shown in FIG. 1, which further includes a displacement pump 26, e.g. a geared pump, a speed-controlled synchronous motor and a tank. Said motor is arranged to drive pump 26. Hydraulic aggregate 25 is connected to a pressure line 28 and a return line 29. These two lines are connected via a control valve 30 to the piston/cylinder drive 11. By switching the control valve 30, the piston can be moved either forwards or backwards.

For the controlling of hydraulic aggregate 25 and control valve 30, a control device 31 is provided. The latter includes a frequency converter generating a variable drive frequency for the motor. Thus, control device 31 determines the rotational speed of pump 26. Said pump speed determines the volume flow supplied to pressure line 28.

On pressure line 28, a pressure sensor 32 is provided for measuring the hydraulic pressure p in the pressure line. The pressure sensor is connected to control device 31 via a line 33.

Hydraulic aggregate 25 includes a housing 35 containing the hydraulic oil. Accommodated in housing 35 is a pump which is configured as an immersion pump and will generate the pressure for the tube system 28,29. Said pump is a volumetric pump consisting of a gear pump or of a plurality of pump segments arranged in a distributed configuration and driven by a motor.

On the front end side of housing 35, an adjustable relief pressure valve 36 and a connector 37 for said tubes 28 and 29 is arranged. In this region, also the pressure sensor 32 for pressure line 28 is provided. A further pressure sensor is provided for return line 29.

Control device 31 comprises a housing with a display 40 arranged in its top side. Said housing is connected to a remote control unit 41 provided for manual control of control valve 30.

The control device is further adapted for connecting thereto a programming unit 42 forming a user interface including a keyboard and a display.

FIG. 4 illustrates the development of the pressure p over time τ during several successive load strokes of the power wrench. It is this pressure which is measured by pressure sensor 32.

In FIG. 4, the load strokes LH1-LH4 of the piston are shown. Each load stroke has an initial portion 45 wherein the pressure rises relatively steeply so as to overcome the friction and, respectively, to reestablish the condition in which the previous lift stroke had been terminated. This load stroke portion is followed by a portion 46 wherein the screw is rotated. At the end of the load stroke, piston 13 abuts against the front end stop of the cylinder (FIG. 2). This will cause a steep pressure build-up which is represented by portion 47. By detection of this steep portion 47, the blocking condition at the end of the load stroke is sensed. Following thereon is dropping portion 48 wherein the return stroke of the piston takes place and the pressure p returns to 0 again.

In each of the load strokes LH1-LH4, the initial portion 45 will be extended relative to the previous load stroke until the rotational moment reached in portion 45 will be reached again. Only then, portion 46 will begin wherein the screw will be rotated against a rotational resistance.

According to one variant, the level of the generated pressure is detected and stored in each load stroke. This is the pressure p of portion 47 at which the switching is performed from the load stroke to the return stroke. For this switchover, either the starting point or the end point of the short portion 47 can be selected. The level of the pressure that has been reached is a parameter for determining the working load. A further parameter for determining the working load is the duration of the load stroke. In this regard, the duration from the start of the initial portion 45 to the end of portion 46 can be evaluated. It is also possible, however, to evaluate only the duration of portion 46, or to include also the duration of portion 48 representing the return stroke. Preferably, the duration of the two portions 45 and 46 is evaluated.

Control device 31 will compute the product of the pressure level and the duration of the load stroke and will add up the thus determined products from load stroke to load stroke, so that a condition variable is obtained which indicates the wear. If this condition variable has reached a predetermined value, maintenance or inspection is due. The difference between the wear limit and the current value can be displayed in order to determine therefrom the remaining interval to the next maintenance time.

The described process of obtaining the condition variable indicating the cumulated working load does not necessarily represent the only criterion for determining the point of time of the next maintenance cycle. Independent of the accumulated working load, the number of load strokes can represent an alternative or additional criterion. Other criteria, such as e.g. the temperature of the hydraulic medium, can be used for performing emergency shutdown or can be included in the condition determination process, e.g. by assigning additional weighting to load strokes wherein the temperature exceeds a limit value.

A second embodiment of the invention will be described hereunder, again with reference to FIGS. 1-4:

From the actual working load of the hydraulic aggregate, characteristic values are computed which allow for conclusions on the (wear) condition of individual aggregate components. This process is carried out substantially on the basis of the pressure/time characteristic line (FIG. 4) detected in screw-tightening processes, possibly also under inclusion of the oil temperature as well as further continuously detected measurement data.

The pressure/time characteristic diagram includes, irrespective of the peripheral devices used for the screw-tightening process (tubes, hydraulic drives, screwing devices . . . ) and irrespective of the specific conditions of screw-tightening (moment of rotation, moment of friction, pitch . . . ), the data of relevance for the wear of the aggregate.

Of particular influence on wear are high pressures, pressure peaks, fluctuations of pressure, the pumped volume as well as the hydraulic performance; besides, the influence of many of these values will change in dependence on the working temperature which is approximated by the oil temperature with sufficient accuracy.

Wear of individual components is dependent from these characteristic values to different degrees; thus, for instance, a sealing will be stressed predominantly in a mechanical fashion due to pressure changes, a pump element, however, will be stressed mainly as a result of the (mechanical and this hydraulic) work performed by it.

Since a component undergoes a continuous change over time along with the component's wear, an integral of these characteristic values over the temporal development makes it possible to draw good conclusions on its wear.

Thus, the characteristic number $z_i$ from start-up ($\tau=0$) up to the point of time $\tau$, which determines the wear of an aggregate component $K_i$, is calculated as follows:

$$z_i = b_{0,i} \cdot \int_0^t p(\tau)^{b_{1,i}} \cdot \left(\frac{d\,p(\tau)}{d\tau}\right)^{b_{2,i}} \cdot q(\tau)^{b_{3,i}} \cdot \vartheta(\tau)^{b_{4,i}}\, d\tau$$

wherein: $p(\tau)$: current pressure at the point of time $\tau$ $\frac{d\,p(\tau)}{d\tau}$:

derivation from $p(\tau)$ at the point of time $\tau$ ("pitch", "change")

$q(\tau)$: volume flow at the point of time $\tau$ (from $p(\tau)$) (to be computed specifically for the respective type series)

$\theta(\tau)$: oil temperature at the point of time $\tau$ $b_{0,i}, b_{1,i}, b_{2,i}, b_{3,i}, b_{4,i}$: component-dependent weighting factors and exponents for the individual characteristic numbers With respect to each component $K_i$, the characteristic number is determined for the wear limit $z_{i,0}$ where maintenance becomes necessary. Then, according to $$g_i = 100\% \cdot \frac{z_i}{z_{i,0}}$$

a wear degree $g_i$ is detected in percent for each component.

For the total aggregate, the maximum of the wear degrees of all n individual components is decisive, i.e.

$$G = \max(g_i)\,|_{i=1}^{n}$$

The invention claimed is:

1. A method for automatically determining the condition of a hydraulic aggregate provided to feed a pressurized hydraulic medium to a hydraulic cylinder for performing load strokes, the method comprising the steps of:

computing, for at least one aggregate component, a wear-indicating characteristic number from pressure of the pressurized hydraulic medium and duration of operation since start-up, determining a wear degree from said characteristic number and from a wear limit which has been set for the aggregate component, determining, for the whole aggregate, a maximum wear degree among the wear degrees of all aggregate components, and using the maximum wear degree to provide a total wear degree, and wherein the computing and determining steps are performed automatically by a computational device.

2. The method according to claim 1, wherein the characteristic number is generated from the time integral of the pressure.

3. The method according to claim 1, wherein temperature of the pressurized hydraulic medium is included into the process of obtaining the condition variable.

4. The method according to claim 1, wherein sensors for error messages are provided and that the number of error messages is included into the process of obtaining the condition variable.

5. The method according to claim 1, wherein, for each load stroke, the product of pressure and duration is computed.

6. The method according to claim 1, wherein the duration of operation of the hydraulic aggregate above and below a limit temperature is measured and evaluated.

7. A hydraulic aggregate provided to feed a hydraulic cylinder for performing load strokes, said hydraulic aggregate comprising a plurality of aggregate components including a pump, a control valve, a pressure sensor for measuring the pressure a pressurized hydraulic medium supplied to the hydraulic cylinder during a load stroke, and a control device including a display means, wherein said control device is configured to compute, for at least one the aggregate components, a wear-indicating characteristic number from the pressure and duration of operation since start-up, to determine a wear degree from said characteristic number and from a wear limit which has been set for the aggregate component, to determine, for the whole aggregate, a maximum wear degree among the wear degrees of all aggregate components, and to provide a total wear degree using the maximum wear degree.

8. The hydraulic aggregate according to claim 7, wherein said control device is configured in a suitable manner to perform an automatic self-test wherein the pump builds up a pressure whose temporal development can be evaluated for error determination.

* * * * *

UNITED STATES PATENT AND TRADEMARK OFFICE

CERTIFICATE OF CORRECTION

PATENT NO. : 8,370,083 B2
APPLICATION NO. : 12/522412
DATED : February 5, 2013
INVENTOR(S) : Wagner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 508 days.

Signed and Sealed this
First Day of September, 2015

Michelle K. Lee
*Director of the United States Patent and Trademark Office*